United States Patent [19]

Whitman

[11] Patent Number: 4,980,988
[45] Date of Patent: Jan. 1, 1991

[54] COMBINATION FISH LANDING NET HOLSTER AND CREEL

[76] Inventor: Peter Whitman, 350 N. Court St., Suite 304, Lapeer, Mich. 48446

[21] Appl. No.: 364,998

[22] Filed: Jun. 12, 1989

[51] Int. Cl.⁵ ............................................. A01K 97/00
[52] U.S. Cl. ...................................... 43/54.1; 224/920; 43/11
[58] Field of Search ......................... 43/54.1, 7, 11, 12, 43/55; 224/920, 921; 206/315.11

[56] References Cited

U.S. PATENT DOCUMENTS

| | | | |
|---|---|---|---|
| 760,048 | 5/1904 | Wilson | 43/54.1 |
| 2,098,636 | 11/1937 | Smith | 43/54.1 |
| 2,469,978 | 5/1949 | Mrozinski | 43/11 |
| 2,475,914 | 7/1949 | Peterson | 224/920 |
| 2,717,391 | 9/1955 | Bracken | 43/54.1 |
| 2,853,709 | 9/1958 | Peterson | 43/54.1 |
| 3,674,188 | 7/1972 | Anderson | 224/920 |

Primary Examiner—Kurt Rowan
Attorney, Agent, or Firm—John J. Swartz

[57] ABSTRACT

A combination net holster and fishing creel comprising a water impervious back and a net front portion secured together about the sides and bottom to form an upwardly opening net receiving pocket sized to receive a fishing net therein. A belt loop is formed in the back portion for receiving a belt about the fisherman's chest and a cord may be employed to secure the lower portion of the apparatus to the user's leg. Fish may be kept within the pocket, while water freely circulates through the net front portion.

9 Claims, 1 Drawing Sheet

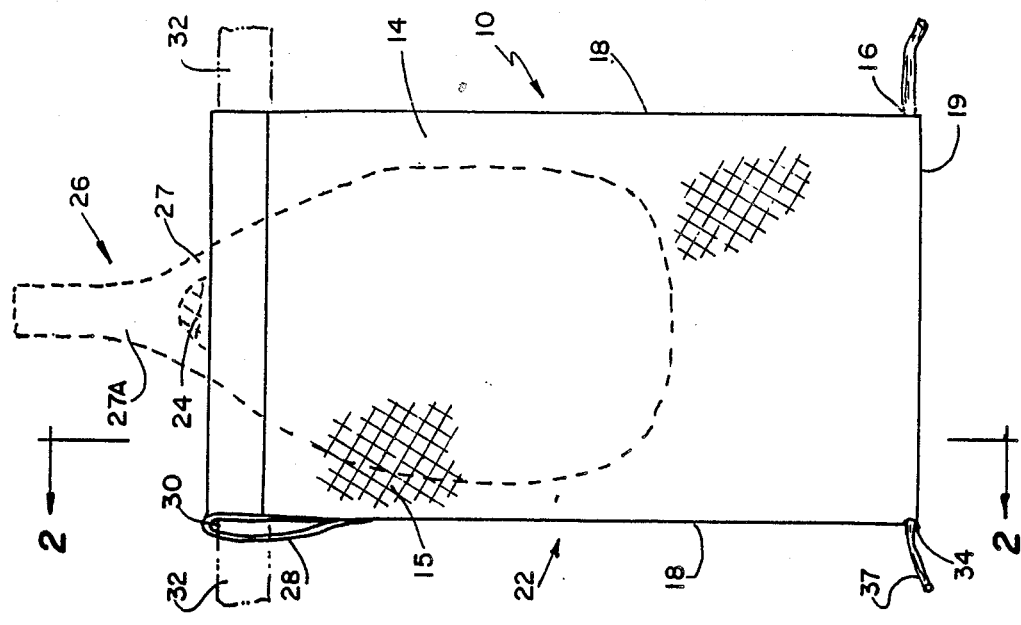
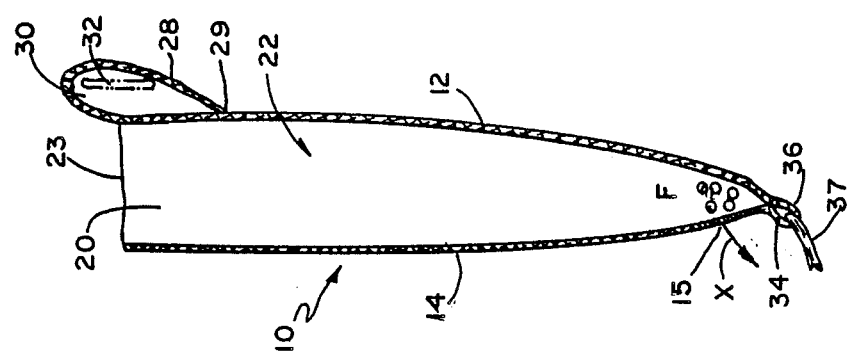
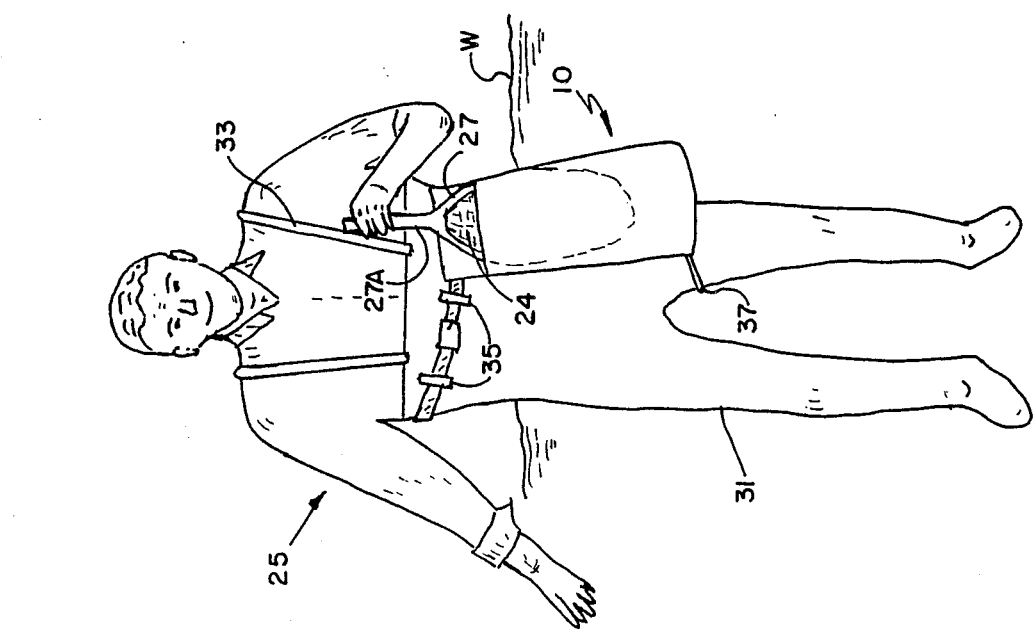

COMBINATION FISH LANDING NET HOLSTER AND CREEL

BACKGROUND OF THE INVENTION

1. Field of the Invention

This invention relates to a combination fish landing net holster and creel which is worn by a fisherman while stream fishing or the like.

2. Objects and Description of Prior Art

Stream fishermen typically carry a landing net for landing fish and a creel for storing the fish. It has been found advantageous to construct the creel of such length that the lower portion of the creel will be immersed in the stream. This allows fish, when caught, to be kept alive in captivity. A live fish bag is disclosed in U.S. Pat. No. 2,795,889 issued to M. Garland on June 18, 1957.

Fishermen have heretofore supported their landing nets from a loop belt or line which passes around their waist. The U.S. Pat. No. 2,212,756 issued to J. Stewart on Aug. 27, 1940, discloses one such device.

Stream fishermen sometimes must walk on the bank of the stream. Nets, which are hung from the body, such as that disclosed in U.S. Pat. No. 2,212,756 issued to J. Stewart on Aug. 27, 1940, will sometimes snag on tree branches or the like found on the shore or bank of the stream. This causes the condition of the net to rapdily deteriorate. A fisherman can become particularly frustrated if his net develops a hole during a fishing trip in a remote area.

Holsters for storing landing nets have been provided heretofore such as that illustrated in the U.S. Pat. No. 2,579,748 issued to F. A. Matthews on Dec. 25, 1951.

In order to be able to freely move about, minimize confusion, and allow quick and easy access to their equipment, fishermen try to minimize the paraphernalia they must carry in a stream.

Accordingly, it is an object of the present invention to provide a new and novel combination fish creel and holster for temporarily stowing a fish landing net.

It is an object of the present invention to provide a new and novel fishing creel which will allow the fishermen to store and carry fish and also serve as a holster for stowing a fish landing net when not is use.

It is another object of the present invention to provide a combination fish landing net holster and creel of the type described for stowing a landing net to avoid entanglement with brush, briars and the like when not in actual use but allows water to pass through a portion thereof for keeping the fish stored therein alive.

It is another object of the present invention to provide a new and novel combination fish creel and landing net holster which is of such size as to allow one to quickly remove the net.

It is important that the position of the combination fish net holster and creel, of the type described, be maintained close to the fisherman's body so as to minimize the probability of the net catching on some object. Accordingly, it is an object of the present invention to provide a new and novel fish landing net holster and creel which has new and novel apparatus for securing same to a fisherman.

Although fishing waders are typically formed with belt loops, fishermen frequently utilize suspenders to suspend their waders. If the waders are secured to the fishermen by a belt received in the belt loops, a measure of safety is provided to a fisherman who falls in the water. If the waders are open at the top, they can quickly fill with water, thus creating a substantial impediment to a fisherman extracting himself from the water. The apparatus constructed according to the present invention includes a loop formed in the upper portion thereof for receiving a belt that will be received in the belt loops of a fisherman's wader. Accordingly, it is an object of the present invention to provide a combination landing net holster and fish creel which will improve the safety of a fisherman walking in a stream or lake.

When the fisherman carrying fish in a creel supported on his body leaves a fishing stream, the fisherman will then carry the fish by his side for a period of time and then will frequently leave the fish in the creel as he transports them to his residence. If the creel is of net construction, portions of the fish, such as scales and slime associated with fish, will seep through the lower portion of the net onto the leg of the fisherman and onto the fisherman's automobile or whatever place on which the fish lay during transportation. Accordingly, it is another object of the present invention to provide a combination fish net holster and creel which includes a protective layer along the inside portion thereof for protecting the user's leg from the fish stowed in the holster.

It is a further object of the present invention to provide a combination landing net holster and fish creel which is formed with a pair of confronting sheets, one of which comprises mesh net material and one of which is water impervious to pass along the fisherman's leg.

It is a still further object of the present invention to provide a combination landing net holster and fishing creel which includes a water impervious back and net front portions secured about the sides and bottom to provide an upwardly opening pocket sized to receive a fishing net therein.

It is still another object of the present invention to provide a combination net holster and creel of the type described including a belt loop formed in the back portion for receiving a belt which passes about the user's chest and a cord along the lower portion thereof for securing the apparatus to the fisherman's leg.

Still another object of the present invention is to provide a combination landing net holster and fishing creel including a sheet of water impervious material and a sheet of water pervious material secured together along the sides and bottom to provide an upwardly opening pocket for receiving a fishing net and fish, with an upper portion of the water impervious sheet being folded over on itself to provide a belt loop for receiving a belt which passes around the girth of a fisherman and a lower portion of the water impervious sheet being folded over on itself to provide a loop for receiving a line which passes around the fisherman's leg.

These and other objects of the present invention will become more apparent as the description thereof proceeds.

SUMMARY OF THE INVENTION

A combination fish creel and fishing net holster comprising a leg protecting sheet of material adapted to lie along the leg of a fisherman, a water pervious sheet confronting the leg protecting sheet, and mechanism securing laterally spaced and bottom confronting edge portions of the sheets to provide an upwardly opening pocket for receiving and storing a fishing net and fish therein.

BRIEF DESCRIPTION OF THE DRAWINGS

The invention may be more readily understood by referring to the accompanying drawings, in which:

FIG. 1 is a perspective view of apparatus constructed according to the present invention mounted on a fisherman;

FIG. 2 is an enlarged sectional side view, taken along the line 2—2 of FIG. 3; and FIG. 3 is a front elevational view of the apparatus illustrated in FIG. 2.

DESCRIPTION OF THE PREFERRED EMBODIMENT

Referring now more particularly to the drawing, a combination and fish landing net holster and creel, generally designated 10, includes an inner or back sheet 12 of water impervious material which may suitably comprise synthetic material or canvas. The combination net holster and creel 10 also includes a confronting layer 14 of mesh net material provided with a plurality of openings or interstices 15 which allows water, generally designated W, to pass therethrough.

The sheets 12, 14 are coupled together along the confronting vertical lateral edge portions 18 and bottom edge portions 19 to provide an upwardly opening pocket 22 for receiving fish, generally designated F, and a fish landing net, generally designated 26. The sheets 12 and 14 are at such length as to allow caught game fish, generally designated F, to be kept alive in the pocket 22 through emersion of at least the lower portion 34 in the lake or stream when the creel 10 is worn by a fisherman 25 as illustrated in FIG. 1. The pocket 22 includes an opening 23 at the upper end thereof which is of sufficient width to freely receive the fish landing net 26.

The fish landing net 26 typically includes a loop frame 27 supporting a net 24 and mounted on a handle 27a as usual.

A stream fisherman typically wears water impervious waders 31 supported from the fisherman's shoulders by suspenders 33. The waders 31 typically include belt loops 35 for receiving a belt 32 to prevent water from inadvertently rapidly filling the inside of the waders in the event that the fisherman falls in the water above the level of the waders 31.

The upper portion 28 of the water impervious sheet 12 is folded upon itself and secured to the water impervious sheet at 29 to provide a loop or elongate belt passage 30. A belt 32 is received by belt passage 30 and is wrapped around the fisherman's chest. The belt 32 is normally received in belt loops 35 provided in water impervious waders, generally designated W, worn by the fisherman.

Securing the combination fish landing net holster and fish creel 10 about the body of the user in the belt loops 35 will improve in the fisherman's safety by encouraging the fisherman to utilize the belt 32 to hold the holster 10.

The lower end 34 of the water impervious sheet 12 is folded on itself to provide an elongate cord receiving loop 36 for receiving an elastic stretch or shock cord 37 which wraps around the leg of the fisherman to secure the holster in position and keep it from engaging objects in the water or on the bank to impede the user's progress.

THE OPERATION

The fishermen will wear his waders W suspended by suspenders 33 and will pass a belt 32 through the loop 30 and thence through the loops 35 on the waders W. The fishermen will pass the shock cord line 37 passing through the bottom loop 36 around the user's leg as illustrated in FIG. 1. The fish net 26 will be disposed in the pocket 22.

When needed, the net 26 can be quickly withdrawn through the upper opening 23. A landed fish F may be placed in the lower end of the creel pocket 22. The fish net sheet 14 will allow the water W to freely pass through the interstices or openings 15 to keep the fish F as the fisherman walks through the water W.

When the fisherman removes himself from the stream, the water impervious sheet 12 will prevent the fish scales and other slime attached to the fish from passing therethrough to the leg of the user. Likewisely, when the fisherman places his catch in his automobile for storage during the return trip, he can merely rest the creel on the side 12 which will preclude the foreign matter therein from passing therethrough.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A combination fish creel and landing net holster comprising:
    a leg protecting sheet of material adapted to lie along the leg of a fisherman;
    a water pervious sheet of material confronting said leg protecting sheet of material;
    each of said sheets of material including laterally spaced, side edge portions and bottom edge portions disposed in confronting relation with said laterally spaced side edge portions and bottom edge portion, respectively, of the other sheet;
    means securing said laterally spaced side edge portions and bottom edge portions of said sheets of material together to provide a pocket with an upwardly opening end for receiving and storing a fishing net and fish and allowing the net to be quickly removed therefrom;
    said leg protecting sheet being water impervious and said water pervious sheet comprises a confronting mesh net layer;
    means coupled to the lower edge portions of said let protecting sheet for detachably connecting said lower edge portions to the leg of a fisherman;
    means for vertically supporting said sheets on a fisherman comprising an upper loop at the upper end of said leg protecting sheet and a line received by said upper loop for passing around an upper portion of a fisherman's body.

2. The holster set forth in claim 1 wherein said upper loop comprises an upper portion of said leg protecting sheet folded over on itself and said means coupled to said lower edge portions of said leg protecting sheet comprises a lower edge portion of said inner sheet folded upon itself to form a lower loop and second line means received by said lower loop for passing around the leg of a fisherman.

3. A combination fish creel and fish landing net holster comprising:
- a pair of upstanding confronting flexible sheets;
  means securing confronting, laterally spaced side edge portions and bottom edge portions of said sheets together to provide a pocket with an upper opening for receiving and storing fish and a fish net; and
- means for detachably securing said pair of sheets to a fisherman;
- one of said sheets being water pervious to allow water into said pocket;
- the other of said sheet including an upper loop; said securing means includes line means received by said loop for detachably securing said sheets to the waist of a fisherman;
- said other sheet including a lower loop and said securing means including additional line means received by said lower loop for detachably securing said sheets to the leg of a fisherman.

4. The combination set forth in claim 3 wherein said lower loop comprises a lower edge portion of said other sheet folded over on itself.

5. The combination set forth in claim 4 wherein said upper loop includes an upper edge portion of said other sheet folded over on itself.

6. The combination set forth in claim 5 wherein said other sheet is water impervious.

7. The combination set forth in claim 6 wherein said one sheet comprises a mesh net.

8. A combination fish creel and fish landing net holster comprising:
- a pair of upstanding confronting flexible sheets;
  means securing confronting, laterally spaced side edge portions and bottom edge portions of said sheets together to provide a pocket with an upper opening for receiving and storing fish and a fish net; and
- means for detachably securing said pair of sheets to a fisherman;
- one of said sheets being water pervious to allow water into said pocket;
- the other of said sheets being adapted to lie along the leg of a fisherman for protecting the leg from matter, such fish scales and the like, within said pocket;
- said other sheet including a loop and said securing means including a line received by said loop for passing around the leg of a fisherman.

9. The holster set forth in claim 8 wherein said water pervious sheet comprises a mesh net.

* * * * *